(12) United States Patent
Storm et al.

(10) Patent No.: US 7,971,769 B2
(45) Date of Patent: Jul. 5, 2011

(54) QUICK CHANGE OVER TOOLING FOR A WELDER

(75) Inventors: Edgar M. Storm, Spencerport, NY (US); Paul F. Spacher, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 75 days.

(21) Appl. No.: 12/610,744

(22) Filed: Nov. 2, 2009

(65) Prior Publication Data

US 2011/0101074 A1    May 5, 2011

(51) Int. Cl.
*B23K 1/06* (2006.01)

(52) U.S. Cl. ...................................... 228/1.1; 228/110.1

(58) Field of Classification Search ............... 156/64, 156/73.1, 73.2, 73.4, 358, 580.1, 580.2; 228/110.1, 228/111, 111.5, 1.1
See application file for complete search history.

(56) References Cited

U.S. PATENT DOCUMENTS

| | | | |
|---|---|---|---|
| 6,425,514 B1 * | 7/2002 | Ou et al. | 228/102 |
| 2006/0279028 A1 * | 12/2006 | Haregoppa et al. | 267/137 |

* cited by examiner

*Primary Examiner* — Emily M Le
*Assistant Examiner* — Megha Mehta
(74) *Attorney, Agent, or Firm* — Fraser Clemens Martin & Miller LLC; J. Douglas Miller

(57) ABSTRACT

A weld stack includes a horn having a weld end, a polar mount adapted to receive a portion of the horn therein, a first adjustment ring coupled to the polar mount at a pre-determined distance from the weld end of the horn, and a second adjustment ring coupled to the polar mount adjacent the first adjustment ring, wherein the second adjustment ring includes a fine adjustment device for adjusting a relative position of the first adjustment ring and the second adjustment ring.

9 Claims, 6 Drawing Sheets

QUICK CHANGE OVER TOOLING FOR A WELDER

FIELD OF THE INVENTION

The present invention generally relates to high frequency welding. More particularly, the invention is directed to a welding assembly and a method for a quick change-over of the welding assembly.

BACKGROUND OF THE INVENTION

Current ultrasonic welding systems are not equipped to support a large-scale production facility. The frequency of failures of an ultrasonic horn and the manner in which the horn fails is often unpredictable. Many of the failures create "emergency equipment repairs", as well as extended downtime and a significant risk to a customer's shipping schedule.

Current ultrasonic welding systems in the field do not accommodate quick changeover features or standard datum features. Accordingly, there is currently no standardized and repeatable replacement set up for the ultrasonic welding systems used in a production facility.

It would be desirable to develop a weld stack for an ultrasonic welding system and a setup fixture for the same, wherein the weld stack and setup fixture provide a means for a quick change over, a repeatable setup, an objective polar adjustment, and a standard off-line initial setup.

SUMMARY OF THE INVENTION

Concordant and consistent with the present invention, a weld stack for an ultrasonic welding system and a setup fixture for the same, wherein the weld stack and setup fixture provide a means for a quick change over, a repeatable setup, an objective polar adjustment, and a standard off-line initial setup, has surprisingly been discovered.

In one embodiment, a weld stack comprises a horn having a weld end, a polar mount adapted to receive a portion of the horn therein, a first adjustment ring coupled to the polar mount at a pre-determined distance from the weld end of the horn, and a second adjustment ring coupled to the polar mount adjacent the first adjustment ring, wherein the second adjustment ring includes a fine adjustment device for adjusting a relative position of the first adjustment ring and the second adjustment ring.

In another embodiment, a setup fixture for a weld stack comprises a frame, a spindle locator coupled to the frame for receiving a weld stack, a radial locator coupled to the frame for receiving a weld end of a horn of the weld stack and positioning the horn in a desired radial position, and a horn locator disposed adjacent the radial locator and abutting a polar mount of the weld stack, wherein the horn locator facilitates a standardization of a configuration of the weld stack.

The invention also provides methods for configuring a weld stack.

One method comprises the steps of: providing a setup fixture having a frame; providing a spindle locator coupled to the frame adapted to permit a polar mount of a weld stack to pass therethrough; providing a horn locator coupled to the frame and abutting the polar mount of the weld stack, wherein the horn locator facilitates a standardization of a configuration of the weld stack; and providing a radial locator coupled to the frame for receiving a weld end of a horn of the weld stack and positioning the horn in a desired rotational position.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
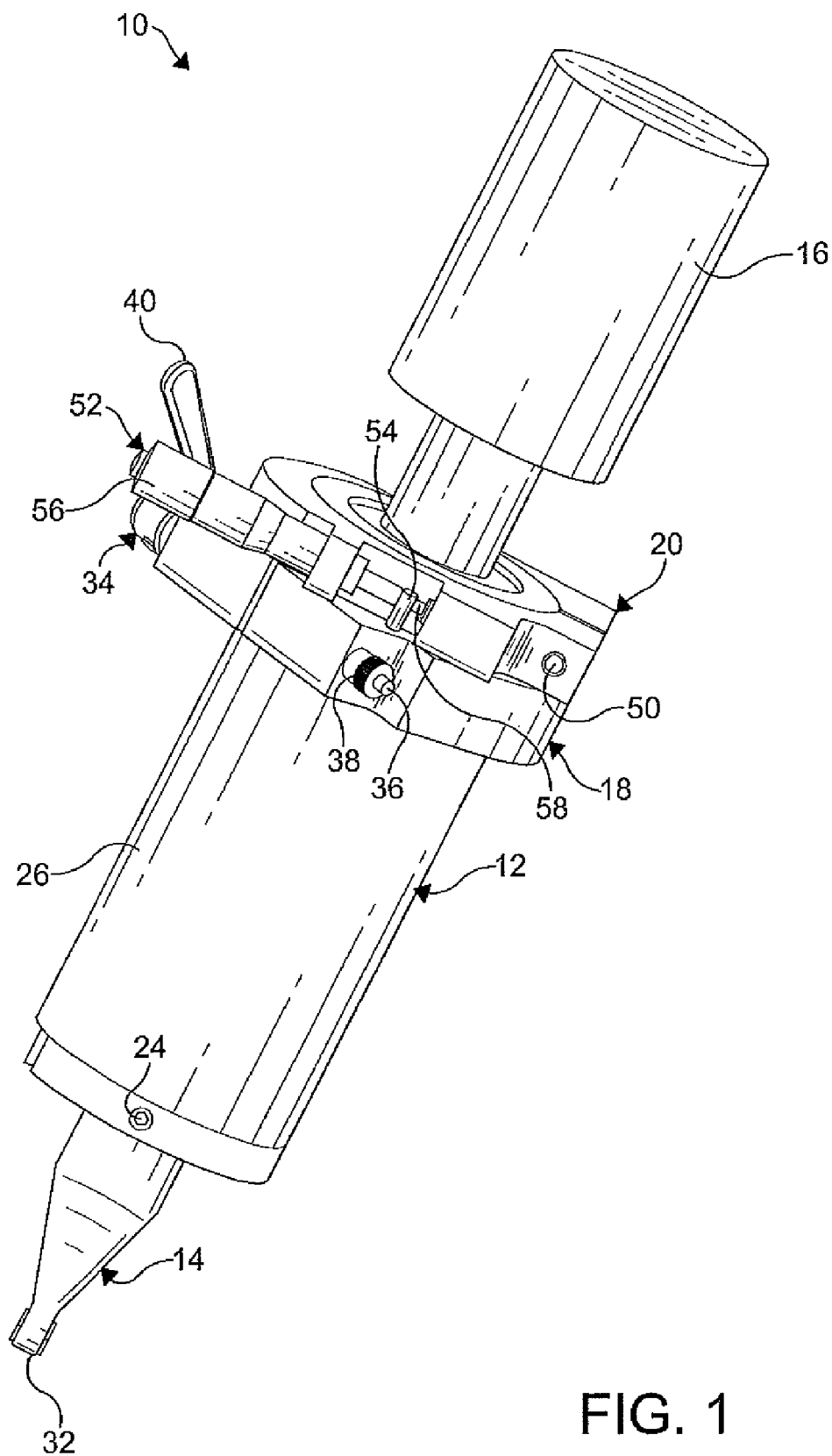
FIG. 1 is a side perspective view of a weld stack according to an embodiment of the present invention, wherein the weld stack is shown in a vertical position.
Figure 2:
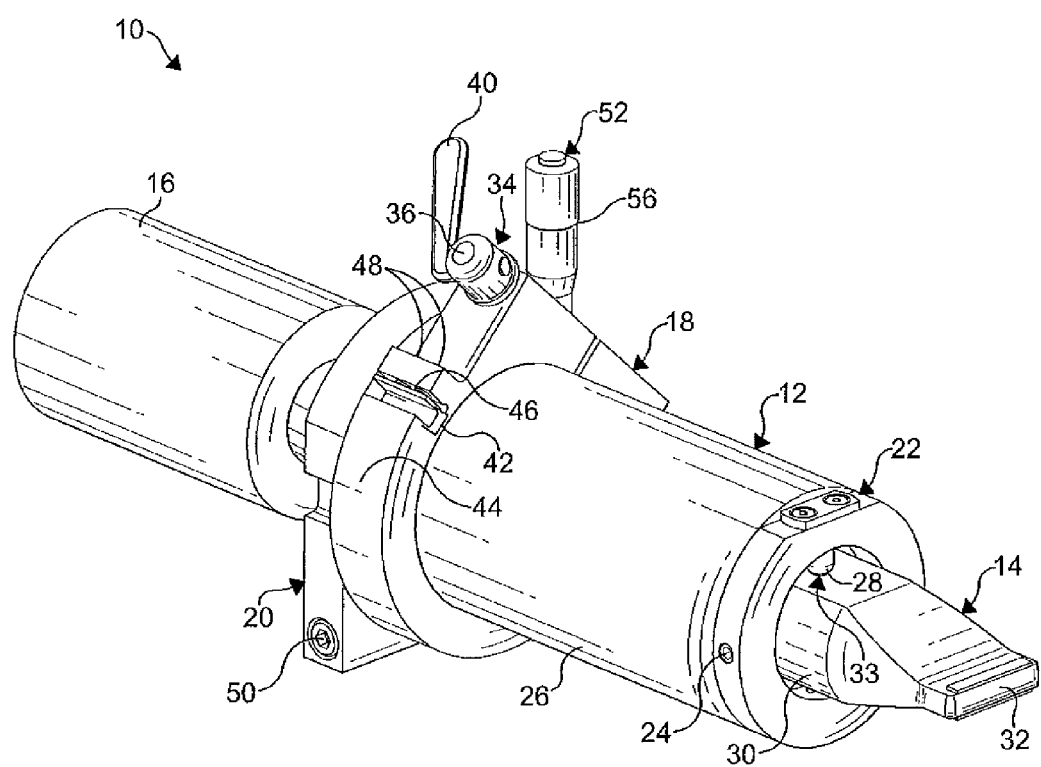
FIG. 2 is a front perspective view of the weld stack of FIG. 1, wherein the weld stack is shown in a horizontal position.

FIGS. 1-2 illustrate a quick change weld stack 10 or ultrasonic stack according to an embodiment of the present invention. As shown, the weld stack 10 includes a polar mount 12 or sleeve, a horn 14, an accelerator 16 or booster, a first adjustment ring 18, and a second adjustment ring 20.

The polar mount 12 is a hollow tube having a generally cylindrical shape. However, any shape and size may be used. The polar mount 12 is adapted to receive at least one of the horn 14 and the accelerator 16 therein. In the embodiment shown, the polar mount 12 includes a plurality of apertures for receiving at least one of a locator 22 and a plurality of set screws 24 for aligning the horn 14 as desired within the polar mount 12. As a non-limiting example, the locator 22 is mounted to an outside surface 26 of the polar mount 12, wherein a rounded end 28 of the locator 22 extends through the polar mount 12 to engage the horn 14. It is understood that the locator may have a pre-determined size for aligning and positioning the horn 14 within the polar mount 12. As a further non-limiting example, the polar mount 12 receives three set screws 24, each of the set screws 24 having a flat end for engaging the horn 14. It is understood that the polar mount 12 may include any number of apertures and through-holes for receiving any number of set screws 24 and locators 22.

The horn 14 includes a main body 30 having a welding end 32. The horn 14 is coupled to the accelerator 16 to provide a pre-determined motion or vibration thereto. As a non-limiting example, the horn 14 is driven at ultrasonic frequency levels. In the embodiment shown, the horn 14 and accelerator 16 are received in the polar mount 12. The horn 14 includes a datum structure 33 such as an indentation for receiving the locator 22 and positioning the horn 14. As a non-limiting example, the datum structure 33 is positioned on the main body 30 of the horn at a nodal point. However, any number of datum structures may be used to align the horn 14 as desired within the polar mount 12.

The first adjustment ring 18 is disposed around the outside surface 26 of the polar mount 12. The first adjustment ring 18 is typically a split collar having a coupler 34 for adjusting an interior diameter of thereof. As shown, the coupler 34 is a quick coupler having a coupling skewer 36 disposed through a split portion of the first adjustment ring 18. One end of the coupling skewer 36 includes an adjustment nut 38 and an opposite end of the coupling skewer 36 includes a cam lever 40. It is understood that the adjustment nut 38 and the cam lever 40 cooperate to adjust the interior diameter of the first adjustment ring 18. It is further understood that any means for adjusting the interior diameter of the first adjustment ring 18 may be used, and that any type adjustment ring can be used.

The first adjustment ring 18 also includes an adjustable width channel 42 formed in an outside edge 44 of the first adjustment ring 18. A flexible tab 46 is disposed adjacent the channel 42 and adapted to receive a "flex" force from a plurality of pins 48 or set screws. For example, the pins 48 exert a force on the tab 46 to adjust a dimension of the channel 42. As a further example, the tab 46 is formed in the outside edge 44 of the first adjustment ring 18. It is understood that any number of pins may be used to exert a force on the tab 46 to adjust a width of the channel 42. It is further understood that the channel 42 may have any size and may be positioned in any location, and that any type adjustment ring can be used.

The second adjustment ring 20 is disposed around the outside surface 26 of the polar mount 12 and adjacent the first adjustment ring 18. The second adjustment ring 20 is typically a split collar having a coupler 50 for adjusting an interior diameter of thereof. As shown, the coupler 50 is a threaded bolt or screw disposed through a split portion of the second adjustment ring 20. It is understood that any means for adjusting the interior diameter of the first adjustment ring 18 may be used such as quick couple device similar to coupler 34.

The second adjustment ring 20 also includes a fine adjustment device 52. As shown, the fine adjustment device 52 is a micrometer. Specifically, a pin 54 is disposed in the first adjustment ring 18 and extends therefrom in a direction of the second adjustment ring 20. An adjustment member 56 of the fine adjustment device 62 is disposed through a portion of the second adjustment ring 20 and abuts the pin 54. A tension device 58 (e.g. a spring loaded pin) is disposed in a portion of the second adjustment ring 20 in alignment with the adjustment handle 56 and abutting the pin 54. A rotational motion of the adjustment handle 56 exerts a force on the dowel pin to adjust a relative position of the first adjustment ring 18 and the second adjustment ring 20.

Figure 3:
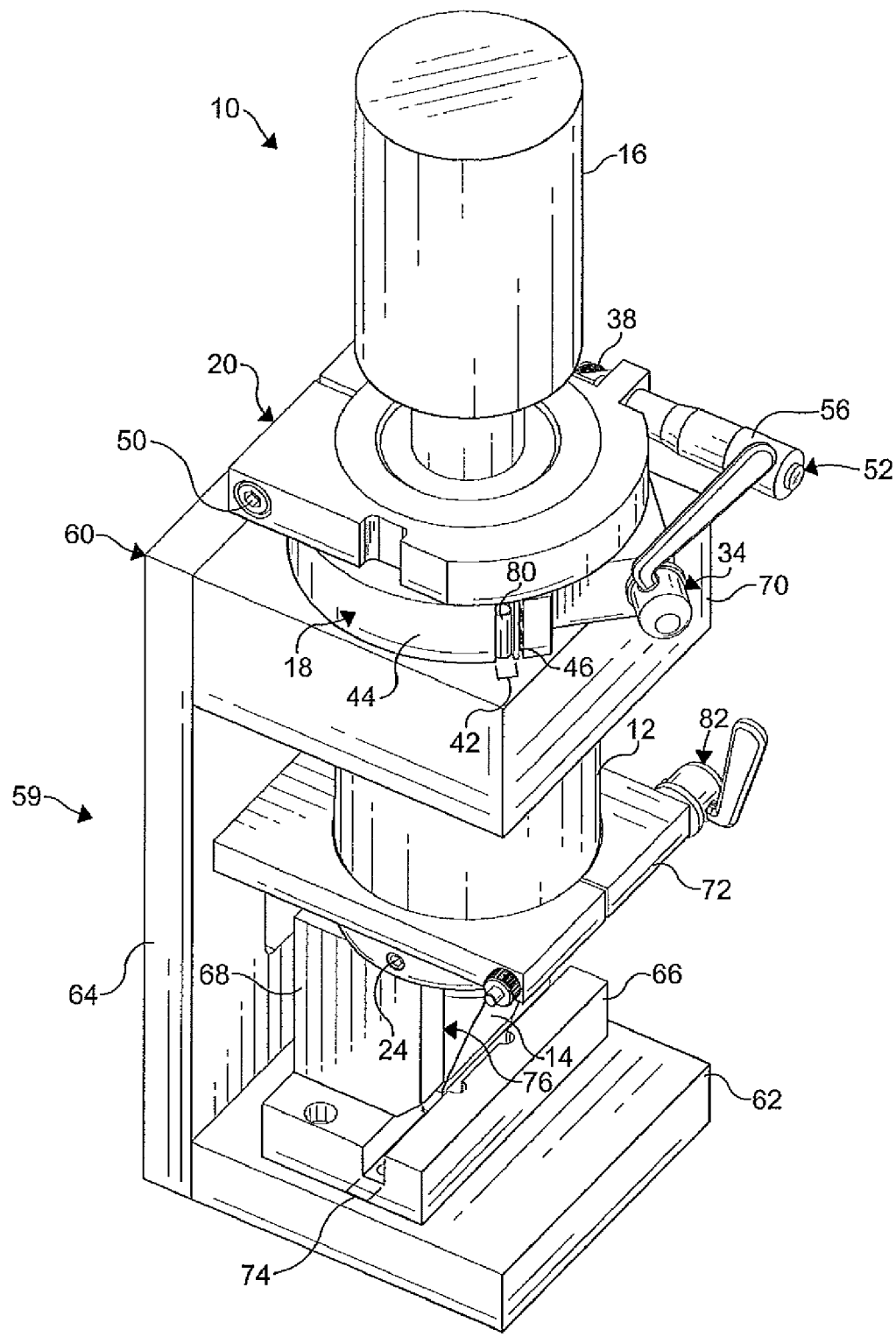
FIG. 3 is a front perspective view of a setup fixture for the weld stack of FIGS. 1 and 2.
Figure 4:
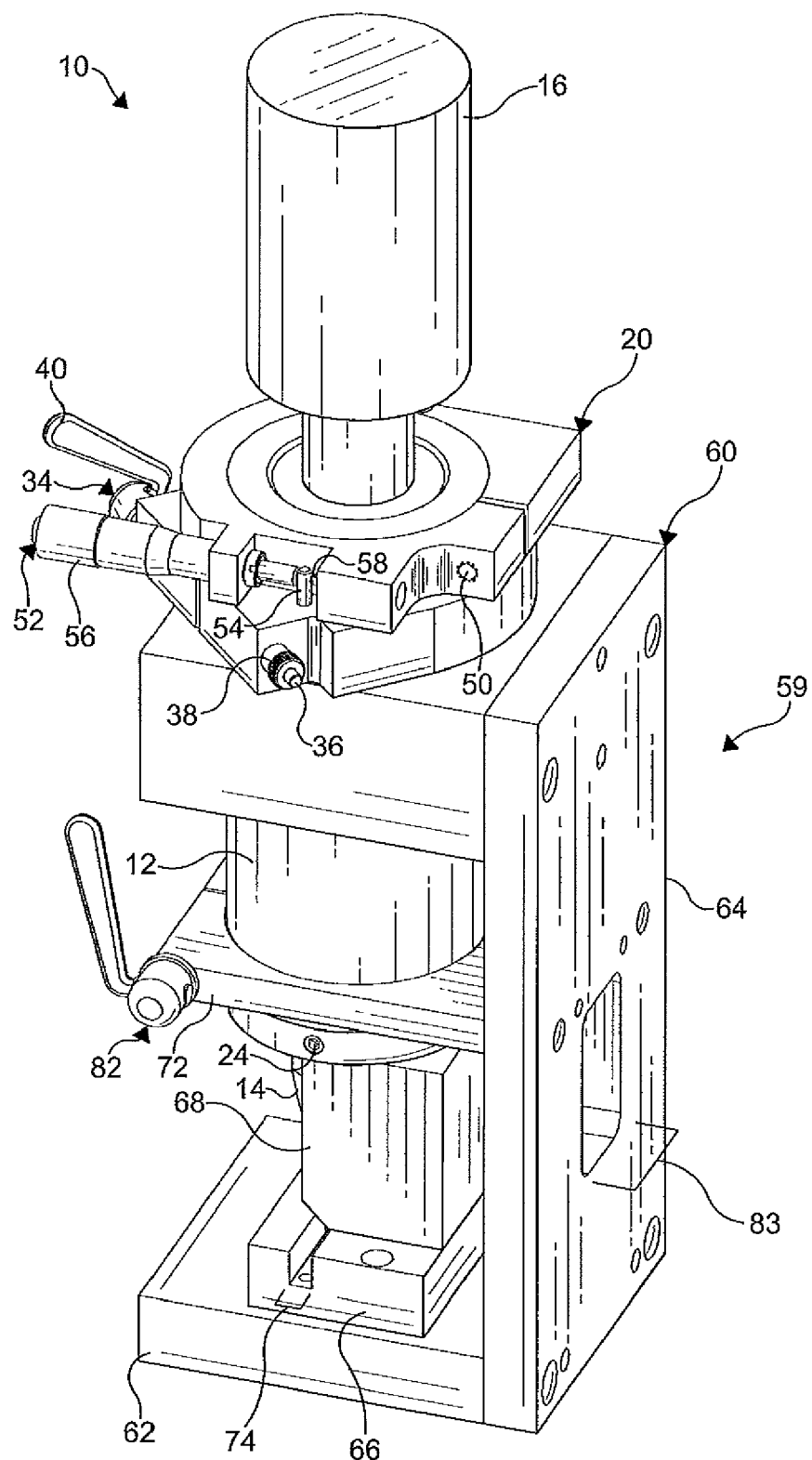
FIG. 4 is a rear perspective view of the setup fixture of FIG. 3.

FIGS. 3-4 illustrate a setup fixture 59 for receiving the weld stack 10 according to an embodiment of the present invention. The setup fixture 59 includes a frame 60 having a base 62 and a back plate 64, a radial locator 66, a horn locator 68, a spindle locator 70 and a clamp plate 72.

The radial locator 66 is coupled to the base 62 and includes a channel 74 for receiving the weld end 32 of the horn 14. The horn locator 68 is coupled to the radial locator 66 and includes a horn channel 76 for receiving at least a portion of the horn 14.

The spindle locator 70 is coupled to the back plate 64 and is adapted to permit a portion of the weld stack 10 to pass therethrough. The spindle locator 70 also includes a pin 80 protruding from a surface thereof. As a non-limiting example, the pin 80 is positioned to be received by the adjustable width channel 42 of the first adjustment ring 18.

The clamp plate 72 is a split collar having a coupler 82 for adjusting an interior diameter of thereof. As shown, the coupler 82 is a quick coupler similar to the coupler 34. However, any means for adjusting an interior diameter of the clamp plate 72 may be used.

When the setup fixture 59 is in use, the polar mount 12 is disposed through the spindle locator 70 and the clamp plate 72, wherein a portion of the polar mount 12 abuts the horn locator 68. The first adjustment ring 18 is disposed around the polar mount 12 and adjacent the spindle locator 70. As a non-limiting example, the first adjustment ring 18 is positioned to dispose the pin 80 into the adjustable width channel 42. The second adjustment ring 20 is disposed around the polar mount 12 and positioned to receive the dowel pin 54 between the adjustment handle 56 and the tension device 58. As a non-limiting example, the fine adjustment device 52 is set to a "zero" or mid-point position. It is understood that the first adjustment ring 18 and the second adjustment ring 20 may move relative to one another until one is sufficiently secured to the polar mount 12.

The horn 14 and the accelerator 16 are disposed in the polar mount 12, wherein a portion of the horn 14 extends through the horn channel 76 and the weld end 32 of the horn 14 is received in the channel 74 of the radial locator 66. It is understood that a size of the horn locator 68 provides a standard for a position of the horn 14 relative to the polar mount 12. It is further understood that the radial locator 66 provides a radial alignment of the horn 14 within the polar mount 12.

Once the horn 14 is disposed in the polar mount 12, the rounded end 28 of the locator 22 is aligned with the datum structure 33 of the horn 14 and the locator 22 is coupled to the polar mount 12. The clamp plate 72 is secured to the polar mount 12 by locking the cam lever 82. The first adjustment ring 18 and the second adjustment ring 20 are each secured to the polar mount 12. It is understood that a position of the first adjustment ring 18 relative to the weld end 32 is standardized based upon the dimensions of the setup fixture 59. The set screws 24 are tightened against the horn 14. As a non-limiting example, the back plate 64 includes an aperture 83 to provide access to at least one of the set screws 24 positioned adjacent the back plate 64. Once each of the set screws 24 is secured, the weld stack 10 is removed from the setup fixture 59 for use.

Figure 5:
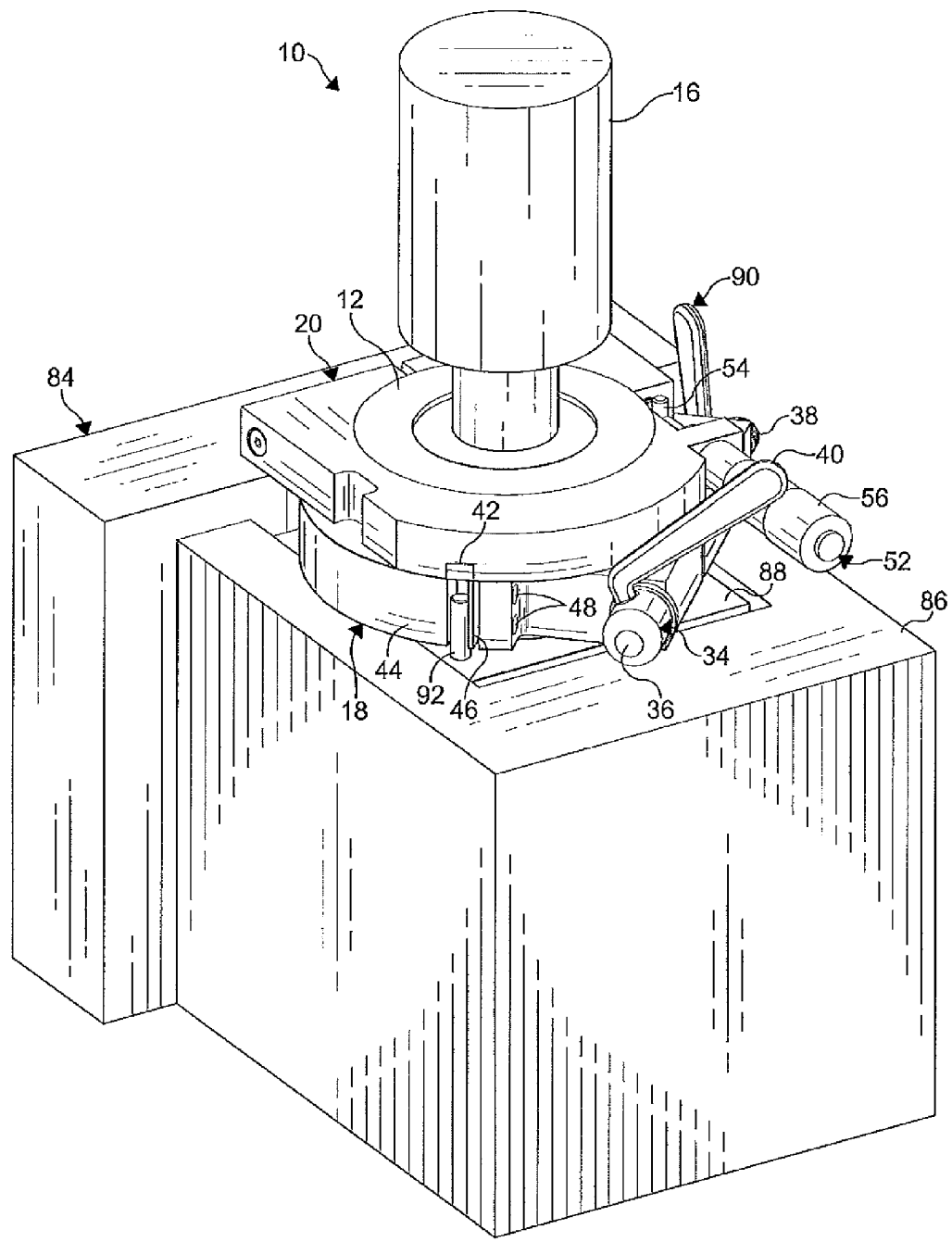
FIG. 5 is a left side perspective view of a mount for the weld stack of FIGS. 1 and 2.
Figure 6:
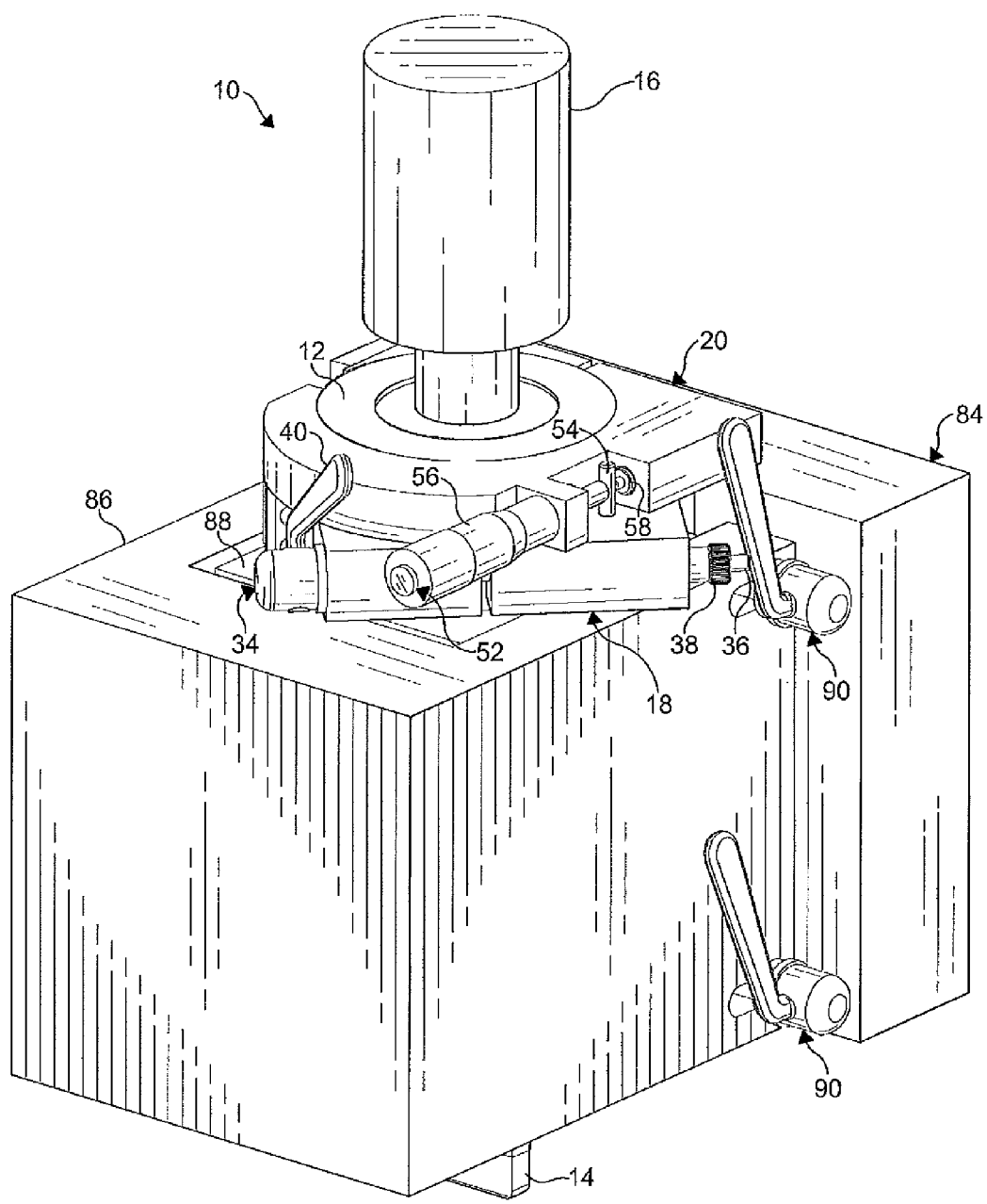
FIG. 6 is a right side perspective view of the mount of FIG. 5.

FIGS. 5 and 6 illustrate a mount 84 for receiving the weld stack 10 according to an embodiment of the present invention. As shown, the mount 84 includes a housing 86 defining a cavity to receive the weld stack 10. A clamp 88 is disposed in the cavity and coupled to the housing 86. As a non-limiting example, the clamp 88 is an elongate split collar for receiving and securing the polar mount 12 therein. The clamp 88 includes a plurality of couplers 90 for adjusting an interior diameter of thereof. As shown, each of the couplers 90 is a quick coupler similar to the coupler 34. The clamp 88 also includes a pin 92 protruding from a surface thereof. As a non-limiting example, the pin 92 is positioned to be received by the adjustable width channel 42 of the first adjustment ring 18 of the weld stack 10. It is understood that any number of couplers 90 and any means for adjusting the interior diameter of the clamp 88 may be used. It is further understood that any mounting device and structure may be used to couple the weld stack 10 to any control system such as a robotic system or robot arm, for example.

In use, the weld stack 10 is disposed in the clamp 88 wherein the first adjustment ring 18 abuts a portion of at least one of the clamp 88 and the housing 86. It is understood that the first adjustment ring 18 is spaced from the weld end 32 of the horn 14 based upon the pre-determined dimension of the setup fixture 59. Once the weld stack 10 is in position, the couplers 90 of the clamp 88 are adjusted to secure the weld stack 10 therein.

The weld stack 10, the setup fixture 59, the mount 84, and the methods according the present invention provide multiple benefits over the art. The present invention minimizes a need for hand tools, thereby simplifying a setup, change-over and replacement process and minimizing a required intervention of a higher level of support. The present invention provides a quick change over tooling so that the entire weld stack 10 can be changed out within minutes, thereby minimizing downtime and maximizing production efficiency. The present invention also provides an objective polar adjustment. The weld stack 10, the setup fixture 59, and the mount 84 provides the operator with a baseline position and an objective measurement system to make future adjustments. Specifically, the horn 14 includes the datum structure 33 to minimize critical stress risers, minimize unwanted downtime, simplify a replacement of the horn 14 and make a resultant weld substantially repeatable after a changeover.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A weld stack comprising:
   a horn having a weld end;
   a polar mount adapted to receive a portion of the horn therein;
   a first adjustment ring coupled to the polar mount at a pre-determined distance from the weld end of the horn;
   an alignment pin protruding from a surface of the first adjustment ring; and
   a second adjustment ring coupled to the polar mount adjacent the first adjustment ring, wherein the second adjustment ring includes a fine adjustment device positioned to engage the alignment pin for adjusting a relative position of the first adjustment ring and the second adjustment ring.

2. The weld stack according to claim 1, further comprising a locator coupled to the polar mount, wherein the locator includes a rounded end to engage the horn.

3. The weld stack according to claim 1, wherein the horn includes a datum structure to cooperate with a locator.

4. The weld stack according to claim 1, wherein at least one of the first adjustment ring and the second adjustment ring is a split collar.

5. The weld stack according to claim 1, wherein at least one of the first adjustment ring and the second adjustment ring includes a quick coupler for adjusting an interior diameter thereof.

6. The weld stack according to claim 1, wherein the first adjustment ring includes a channel formed thereon to receive a pin for aligning the weld stack.

7. The weld stack according to claim 6, wherein the first adjustment ring includes a flexible tab disposed in the channel to adjust a dimension of the channel.

8. The weld stack according to claim 1, wherein the fine adjustment device is a micrometer disposed for exerting a force on the alignment pin to adjust a relative position of the first adjustment ring and the second adjustment ring.

9. The weld stack according to claim 1, wherein the horn is in communication with an accelerator and at least a portion of the accelerator is received by the polar mount.

* * * * *